United States Patent

[11] 3,611,376

| [72] | Inventor | Frank S. Gutleber<br>Little Silver, N.J. |
|---|---|---|
| [21] | Appl. No. | 847,136 |
| [22] | Filed | Aug. 4, 1969 |
| [45] | Patented | Oct. 5, 1971 |
| [73] | Assignee | Lockheed Aircraft Corporation<br>Burbank, Calif. |

[54] RADAR SYSTEM WITH BEAM SPLITTER AND SYNTHETIC STABILIZATION
25 Claims, 8 Drawing Figs.

[52] U.S. Cl. ............................................. 343/11 R
[51] Int. Cl. ............................................. G01s 9/02
[50] Field of Search ............................................. 343/11

[56] References Cited
UNITED STATES PATENTS
| 2,625,678 | 1/1953 | Allison | 343/11 |
| 3,508,261 | 4/1970 | Danzer et al. | 343/11 |
| 3,528,070 | 9/1970 | Young, Jr. | 343/11 |

*Primary Examiner*—Malcolm F. Hubler
*Attorneys*—Billy G. Corber and George C. Sullivan

ABSTRACT: A multifunction radar system generating a vertical fan beam of radiant energy continuously movable in azimuth for terrain mapping with a plan position indicator-type display screen and including antenna means having a fan beam energy-response pattern generally normal to the vertical fan beam and movable in elevation to intersect the vertical fan beam at selected elevation angles for detecting reflected energy and generating a range marker on the display screen defining an elevation-aiming angle for performing various target-tracking functions including establishing glide slopes, clearance planes and direction-control information. The generated range marker is stabilized relative to pitching motion of the vehicle as well as referenced to the antenna boresight axis by special processing of composite return signals.

FIG_1

FIG_6

INVENTOR.
FRANK S. GUTLEBER

INVENTOR.
FRANK S. GUTLEBER
BY George C Sullivan, agent
Billy G. Carber
Attorney

FIG_8

RADAR SYSTEM WITH BEAM SPLITTER AND SYNTHETIC STABILIZATION

BACKGROUND OF THE INVENTION

This invention relates generally to radar and more particularly to a multifunction radar system specially suited for use on moving platforms such as a helicopter. Elevation-angle information is obtained on selected targets through the use of elevation antenna and signal-processing means which detect composite return signals to generate a stabilized range marker on a range and azimuth display of the plan-position-indicator type.

In the field of navigation, terrain mapping, terrain avoidance, anticollision and aircraft-landing-approach radar systems, as well as, to some extent, fire control and automatic-guidance radar systems, there is a need for radar and radar presentation which shows the observer what his eye would see in a given field of view but for fog, clouds, rain, snow, darkness, or other visual obstacles including physical structures.

Although the present invention finds particularly useful application in airborne terrain-avoidance and landing-approach radar, and although much of the discussion herein relates directly thereto for purposes of clarity and a ready understanding of the invention, it is to be understood that the invention is not limited to such uses. Other applications, such as in boats, hydroplanes, or space-rendezvous systems, will be readily apparent to those skilled in the art.

With terrain-mapping and terrain-avoidance radar systems heretofore available, an airplane or helicopter pilot, in approaching e.g., broken terrain or a landing strip at night, may have visual guidance through observation of terrain obstacles and runway lights. However, when these are periodically or suddenly obscured, the pilot has either to accept the temporary "blindness" or resort to instruments, the information from which is presented to him in a form totally different from the actual visual presentation to the eye through the airplane windshield. Typically, the instrument information is audio or visual by way of several different instruments mounted in the cockpit. Furthermore, at best, no single such instrument heretofore available presents a desirable amount of information as to position, range through parallax or changing spatial relationships, and character of terrain, obstacles and runway. The deficiencies and dangers of, as well as the difficulties of, using the prior art systems in such situations are manifest.

SUMMARY OF THE INVENTION

It is a primary object of the present invention to provide a multifunction radar system which applies both target-elevation-angle information and a terrain-mapping display of objects in the field of view according to their relative range and azimuth positions. An elevation-angle range marker generated by reflected energy from the target is superimposed on the terrain-mapping display for performing various tracking functions including establishing glide slopes, clearance planes and direction-control information. Radiant energy in a vertical-fan-beam pattern is swept in azimuth using a rotating horizontal- transmitting antenna to provide reflected energy from objects within the viewing field. The reflected energy is detected by a dual-receiver system. One receiver preferably utilizes the transmitting antenna operating in a receive mode to drive a plan-position-indicator-type display unit to give relative range and azimuth positions of reflective objects in the viewing field. The other receiver is used to generate a marker on the display screen representing the elevation-aiming angle of a vertical antenna angularly movable in elevation and having a generally horizontally oriented fan-beam energy-response pattern orthogonally intersecting the vertical fan beam. Positioning of the vertical antenna so that the range marker intersects with a selected target appearing on the display screen provides the desired elevation-angle information.

Another object of this invention is to provide a pitch-correction circuit for synthetic stabilization of a radar display range marker wherein the marker is range-stabilized with respect to variations in attitude of the support vehicle on which the equipment is carried.

Another object of this invention is to provide a multifunction radar antenna system employing at least two antennas arranged to provide at least two intersecting fan-beam energy-response patterns such that the intersection of spatial coincidence defines a pencil beam. One of the fan beams is generally horizontally oriented and movable in elevation, while the other is generally vertically oriented and movable in azimuth. The vertically oriented beam is continuously rotated in azimuth such as by mounting the antenna in a helicopter rotor blade while the horizontally oriented beam is selectively moved in elevation to aim the pencil beam at a desired target within the total field of view.

Another object of this invention is to provide a beam-pattern estimator for beam splitting a composite return signal to achieve a narrow, hairline type of display marker for accurately estimating the boresight axis of an antenna.

Still another object of this invention is to provide a crossed-beam multifunction radar system which presents, throughout a given solid viewing angle, a visual presentation of the viewing field including elevation-angle information with respect to selected targets.

Further and other objects and advantages will become apparent from the following detailed description, especially when considered together with the accompanying drawing wherein like numerals refer to like parts.

DESCRIPTION OF THE PREFERRED EMBODIMENTS

Referring to the figures in more detail, it is stressed that the particulars shown are by way of example and for purposes of illustrative discussion only, and are thus presented in the cause of providing what is believed to be the most useful and readily understood description of the principles and structural features of the invention. In particular, the detailed showing is not to be taken as a limitation upon the scope of the invention which is defined by the appended claims forming, along with the drawings, a part of this specification.

Figures 1, 6:
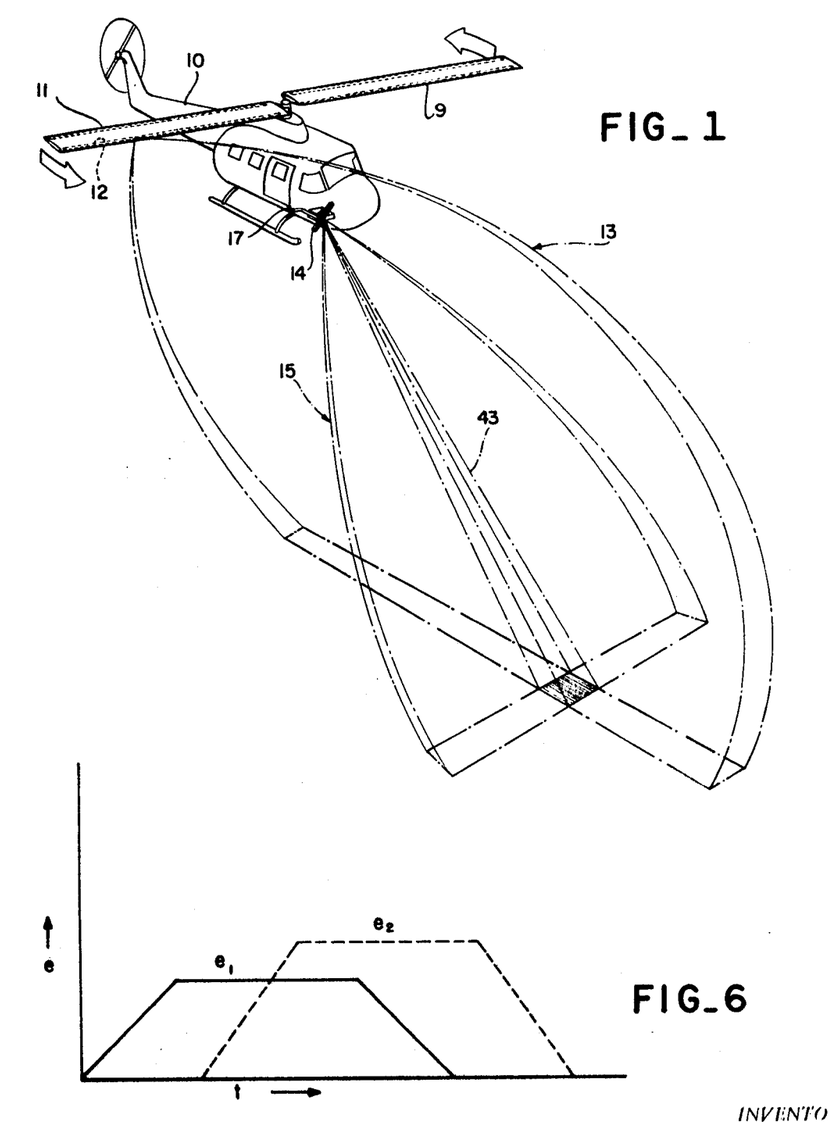
FIG. 1 is a perspective view of a helicopter vehicle embodying an example of the present invention and showing typical orientation of the intersecting fan beams.
FIG. 6 is a view showing the input waveforms applied to the voltage comparator in the leading edge beam-pattern estimator of FIG. 5.

In FIG. 1 is shown a helicopter 10 having rotor blades 11 with leaky waveguide-type antennas 12 mounted in the leading-edge portion of one or more of the blades. The detail construction of the waveguide antenna forms no part of this invention and is accordingly not shown or described herein in detail. Attention is directed to U.S. Pat. No. 3,389,393, issued to D. W. Young, Jr. and entitled "Low Profile Broadband Microwave Antenna System" for a detailed showing of rotor blade antennas suitable for use in the radar system of this invention. Such antennas exhibit a fan-beam-radiation pattern generally normal to the plane of the rotor as indicated by vertical fan beam 13.

As rotor blade 11 swings about its generally vertical axis, vertical fan beam 13 is repeatedly swept in azimuth across the desired field of view at a frequency sufficient to drive the radar display. In helicopter installations, a single antenna in one of the rotor blades will typically provide adequate system resolution. However, where desired, the repetition rate of the vertical fan beam may be increased by the use of antennas in more than one blade.

A second antenna 14 which may be of a type similar to that mounted in the rotor blade is oriented such that its characteristic fan-shaped narrow-beam pattern 15 is typically in a generally horizontally oriented plane orthogonal to vertical fan beam 13. Fan-shaped narrow beam 15 is movable in elevation by pivotally mounting vertical antenna 14 to swing about a generally horizontal axis 16 as most clearly shown in FIG. 2. Positioning of antenna 14 to establish the desired elevation angle for beam 15 may be accomplished remotely, as taught in the above-identified copending application, or by movement of lever 17 manually by the radar operator.

Figure 2:
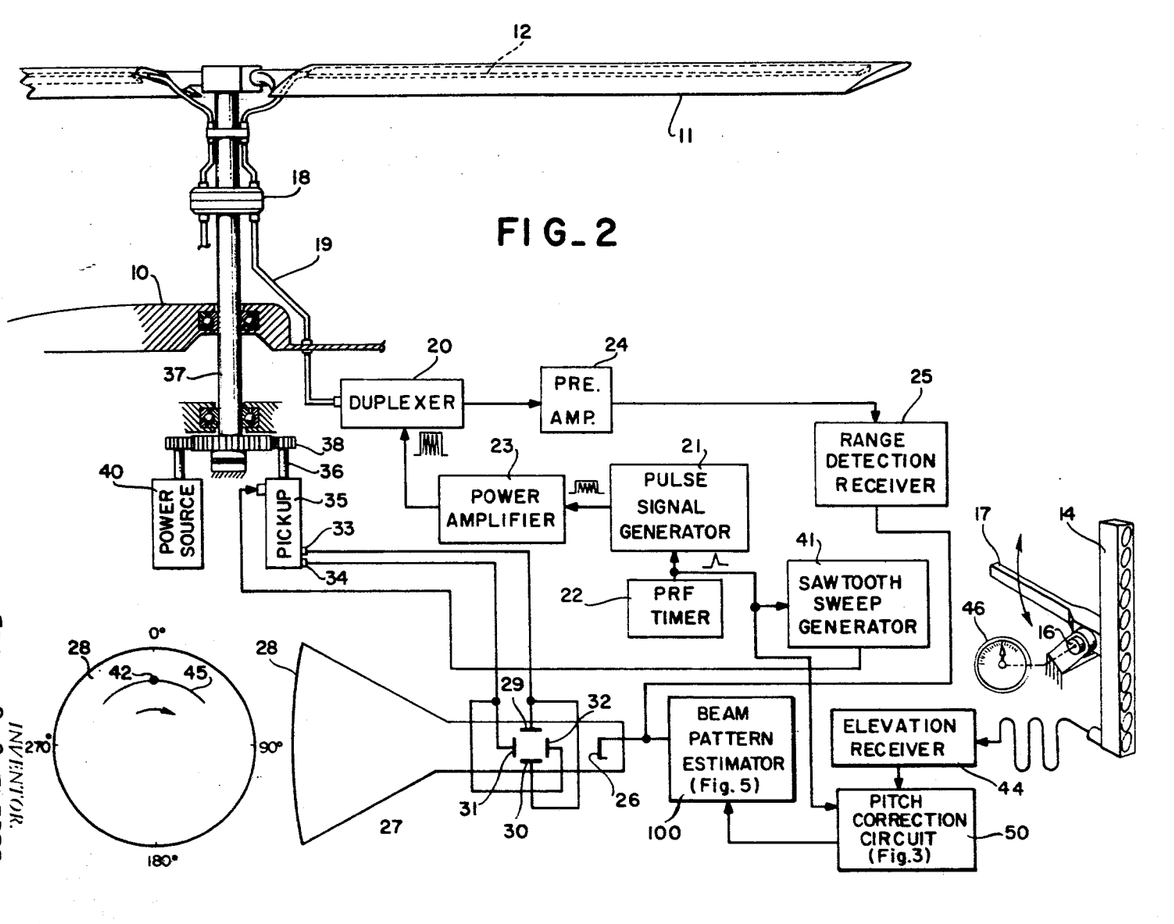
FIG. 2 is a schematic view of an example of a crossed-beam radar system constructed in accordance with the principles of the present invention.

As best shown in FIG. 2, rotor blade antenna 12 is suitably coupled through microwave rotary joint 18 and waveguide 19 to a duplexer 20 forming a part of the radar system and housed within helicopter 10. The details of the microwave feed system between rotor blade antenna 12 and duplexer 20 form no part of this invention and are disclosed in copending U.S. Pat. application, Ser. No. 706,068, filed Feb. 16, 1968 by Blume et al. and entitled "Improved Multichannel Waveguide Rotating Joint." Where antennas in more than one rotor blade are employed for the system, they may be separately coupled through the rotary joint or through a common feed to duplexer 20. Also, where one of the rotor blades carries a trailing-edge antenna, as illustrated at 9 in FIG. 1, and used only for reception, it may be coupled directly to the radar-receiver section, eliminating the need for duplexer 20. Even when only one rotor blade antenna is employed in the system for both transmission and reception, it may be desirable to duplicate the rotating hardware as illustrated in FIG. 2 for dynamic balancing purposes.

Duplexer 20 in the system of FIG. 2 serves the customary purpose of isolating the receiver section of the radar system while passing energy from the transmitter section to the radiating antenna and isolating the transmitter section while passing reflected energy through to the receiver section during the intervals between application of radar pulses. The transmitter section of the radar system includes a pulse signal generator 21 which is keyed to trigger pulses from a timer 22 to produce a continuous series of radar pulses of high frequency electromagnetic energy at a pulse-repetition rate determined by the timer output. The radar pulses from signal generator 21 are applied to a power amplifier 23 and fed to rotate blade antenna 12 via duplexer 20.

The pulses of high frequency electromagnetic energy are radiated from the rotor blade antenna as a narrow vertical fan beam. The beam is swept in azimuth using a power source 40 as shown in FIG. 2 drivingly engaging rotor shaft 37 through gear train 38. On a helicopter, the power source maintains the desired rotor blade rotational velocity both to produce lift for the vehicle and azimuth scanning of the vertical fan beam.

Portions of the radiated fan-beam energy are reflected by remote targets such as those on the earth's surface and conveniently received through the same rotor blade antenna 12 as was used for energy transmission. The received energy is fed through duplexer 20 to a preamplifier 24. The amplified return signals are applied to a range-detection receiver 25 and processed to provide an electron-emitting control voltage for cathode 26 of a cathode-ray display tube 27. The electron beam emitted by cathode 26 is focused on the face 28 of tube 27 forming a visible image of the reflective objects in a plan-position indicator-type presentation according to their relative range and azimuth positions.

Vertical deflection plates 29 and 30 of display tube 27, as well as horizontal deflection plates 31 and 32, are coupled to respective outputs 33 and 34 of a resolver-type pickup 35. Input shaft 36 of resolver pickup 35 is operatively coupled to rotor blade shaft 37 through suitable gearing 38 whereby the rotational position of resolver input shaft 36 represents the rotational or instantaneous azimuth position of vertical fan beam 13 associated with rotor blade antenna 12. The two outputs 33 and 34 of resolver pickup 35 represent the sine and cosine functions of the rotational movement of the rotor blade.

The applied voltage for resolver pickup 35 is obtained from a sawtooth sweep generator 41 which is synchronized by timing pulses from timer 22 with the radar pulse output of signal generator 21. The sweep voltage applied to resolver pickup 35 from sweep generator 41 rises linearly, starting with each transmitted radar pulse and ending at some predetermined later time before transmission of the next-succeeding radar pulse, representing the maximum range of the radar device. Thus, when the outputs 33 and 34 of resolver pickup 35 are applied to the vertical and horizontal deflection plates 29, 30, 31 and 32 of cathode-ray tube 27, a beam-deflecting magnetic field is generated within the tube which rotates in synchronism with the rotation of rotor blade antenna 12 while its field strength repeatedly increases linearly with time to represent the range sweep of the transmitted radar pulse energy. The reflective objects within the radar field of view are presented on the viewing screen according to their relative range and azimuth position, as illustrated in FIG. 2. The distance of image 42 from the center of tube face 28 represents the range of a reflective object and the rotational position of image 42 represents the relative azimuth position of the remote object. In reality of course, numerous objects will be illuminated by the vertical fan beam and made to appear on the viewing screen at their respective range and azimuth positions. Thusly, an image of the viewing field of the radar is formed on face 28 of display tube 27. When the fan beam is directed to impinge upon the earth's surface from an airborne vehicle, a map of the surrounding terrain which may include a landing strip, for example, will be displayed to the operator with various obstacles appearing according to their respective range and azimuth locations relative to the vehicle.

The third spatial dimension, elevation, is presented for selected targets in accordance with the teachings of this invention through the use of vertical antenna 14 having a characteristic fan-beam radiation-response pattern 15 as illustrated in FIG. 1 orthogonally intersecting vertical fan beam 13. The intersection of the vertical and horizontal fan beams defines a narrow pencil beam 43. By positioning antenna 14 to provide a desired elevation-aiming angle for the generally horizontally oriented fan beam 15, the reflective object or objects in narrow pencil beam 43 are detected by reflected energy returned as a composite signal which is applied to an elevation receiver 44. Elevation receiver 44, pitch-correction circuit 50 and beam-pattern estimator 100 process the composite return signals to provide a control voltage for cathode 26 of display tube 27. An elevation-angle range marker 45 is thus formed on tube face 28 at the target range position. The tilt angle of fan beam 15 represents the elevation angle of the desired target when marker 45 intersects the selected target image on the display screen. Through manipulation of lever 17, horizontal fan beam 15 may be moved to any desired elevation position within the field of view to provide elevation angle information on selected targets such as a landing strip, a suspected terrain obstacle, or a ground or airborne target.

In using the system to establish a desired glide slope to a touchdown point, the operator simply adjusts the tilt angle of vertical antenna 14 such that the elevation-angle range marker 45 on face 28 of tube 27 intersects the desired landing spot and flies the vehicle holding the vertical antenna tilt angle constant while maintaining a flight path causing range marker 45 to stay on the preselected target imaged on the face 28 of display tube 27. Should range marker 45 move out in range from the selected-target image, an indication is presented to the operator that the vehicle is above the desired glide slope path and, should range marker 45 move below the selected-target image, an indication is provided that the vehicle has dropped below the desired glide slope path.

Clearance planes over terrain obstacles may be established in a similar manner by determining the elevation angle of the obstacles and flying the vehicle to maintain the desired clearance between the vehicle and the obstacles.

As shown in FIG. 2, the tilt angle of vertical antenna 14 relative to the vehicle may be measured and presented to the operator in readable form such as by dial indicator 46 coupled to shaft 16 defining the axis of rotation of the vertical antenna. Calibration of dial indicator 46 in degrees will permit the operator to readily determine any desired elevation angle within the viewing field of the system.

Because of the narrow profile of vertical antenna 14, it may be mounted either internally of the vehicle or externally without appreciably affecting aerodynamic drag, pilot visibility, or armament and other equipment space requirements.

Figures 4, 5:
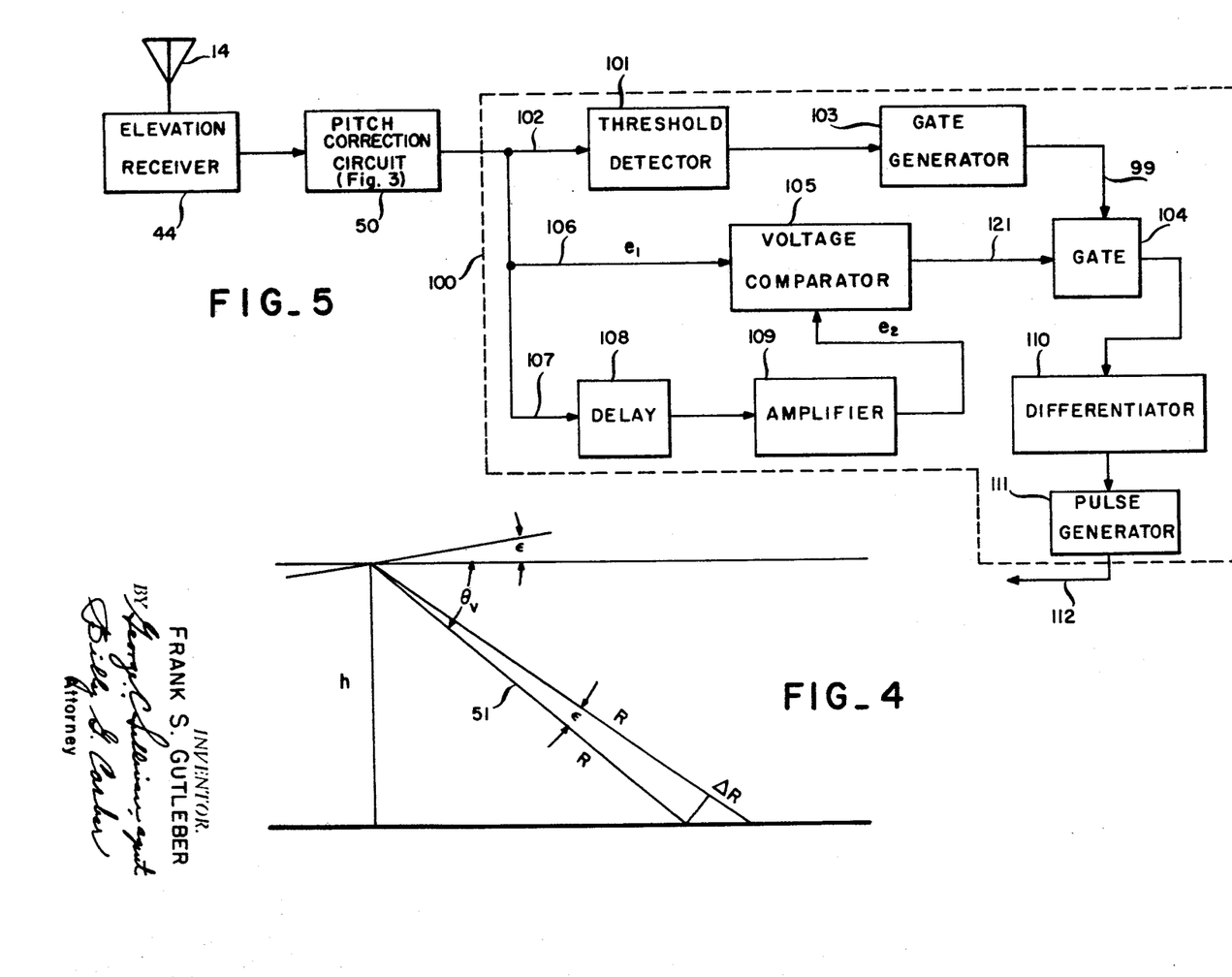
FIG. 4 is a view showing the geometry for beam-pointing error resulting from unstabilized pitching motion of the system hardware carried on a moving vehicle.
FIG. 5 is a schematic block diagram showing a leading edge beam-pattern estimator employed in the system of this invention.

When the radar system is employed as a landing aid device to establish a desired glide slope path to touchdown or for terrain avoidance, for example, pitching motion of the vehicle operating as an unstabilized platform can result in producing undesirable flutter motion and false range reading of range marker 45, as displayed on the face 28 of tube 27. This effect is illustrated in FIG. 4 wherein a change, $\epsilon$, in pitch attitude of the vehicle relative to a reference attitude causes a corresponding shift in the aiming angle $\theta_v$ of the elevation antenna boresight axis 51. It is the function of pitch-correction circuit 50 to synthetically stabilize range marker 45 and achieve the equivalent of maintaining a ground reference point fixed in the presence of pitching motion of the vehicle without using an output signal from a stabilized platform to steer the vertical antenna to compensate for changes in pitch.

This synthetic stabilization is accomplished by time displacing the composite ground-return signal picked up by antenna 14 so as to correspond in time to where it would be if the vertical antenna was on a stabilized platform. How much the range should be adjusted to do this is best expressed mathematically. Referring to FIG. 4, where $R$ represents range to target, $\epsilon$ represents change in pitch attitude relative to a reference attitude and $\Phi_r$ represents the aiming angle of the elevation antenna relative to the reference attitude, the following trigonometric equation may be written:

$$\frac{R}{\sin(\theta_v - \epsilon)} = \frac{R + \Delta R}{\sin(180 - \theta_v)} \quad (1)$$

Solving equation (1) for $R$ in terms of $(R+\Delta R)$ yields:

$R = (\cos\epsilon - \sin\epsilon\cot\Phi_r)(R+\Delta R)$. (2)

Now, for relatively small pitch-attitude angles, which is the usual case, one may assume $\cos\epsilon = 1$ and $\sin\epsilon = \epsilon$. Thus, equation (2) may be rewritten as follows:

$R = (1 - \epsilon\cot\Phi_r)(R+\Delta R)$. (3)

Rearranging equation (3) yields:

$\Delta R = \epsilon\cot\Phi_r(R+\Delta R)$. (4)

Figure 3:
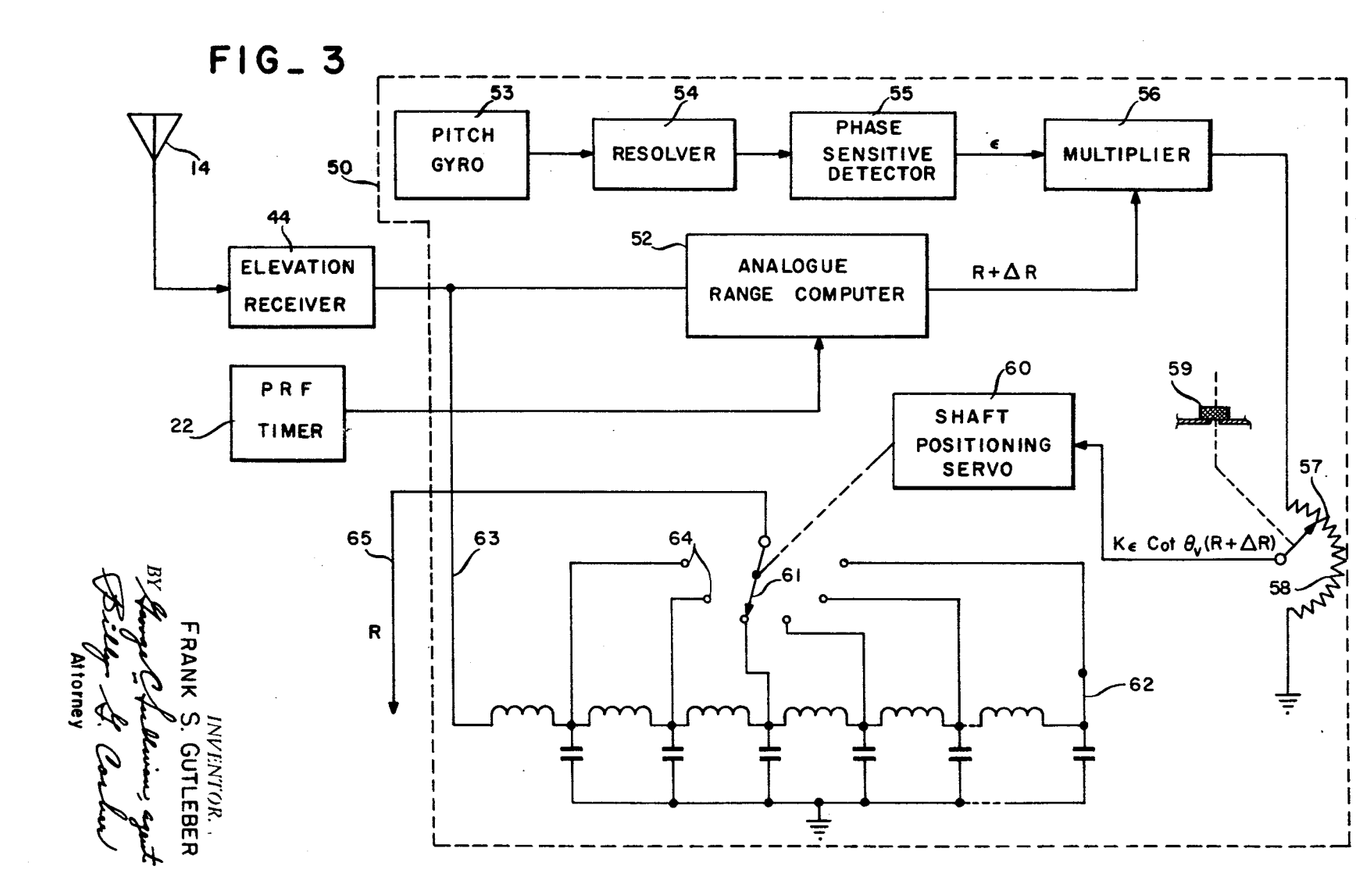
FIG. 3 is a schematic block diagram showing the pitch-correction circuit employed in the system of this invention.

The range-increment change, $\Delta R$, is solved for above the terms of $(R+\Delta R)$ since this is the range of the returned echo and is directly measurable. Equation (4) allows simple implementation to correct for the range error resulting from a pitch $\epsilon$ of antenna 14 due to motion of the platform. The hardware involved is illustrated in FIG. 3 wherein the output of elevation receiver 44 is coupled to an analog range computer 52 wherein composite return signals are compared on a time basis with the output from pulse-repetition-frequency timer 22 to yield an output voltage representing $(R+\Delta R)$ which is the measured range of the returned echo. A pitch gyro 53 driving a resolver 54 provides an electrical output signal which is coupled to a phase-sensitive detector 55 to produce an output voltage representing the vehicle pitch-attitude error angle $\epsilon$. These two voltages representing $(R+\Delta R)$ and $\epsilon$ are combined in a multiplier 56 and applied to a variable potentiometer 57. Wiper arm 58 on potentiometer 57 is suitably positioned such as by a manually adjustable knob 59 to represent the antenna aiming angle $\Phi_r$ and yield a control voltage representing the product $\kappa\epsilon\cot\Phi_r(R+\Delta R)$. It will be recognized from equation (4) above that this voltage obtained at wiper 58 on potentiometer 57 amounts to a solution of the equation for range-increment change $\Delta R$. This voltage is applied to a shaft-positioning servo 60 which drives a wiper arm 61 on a variable-delay line 62. Composite return signals processed by elevation receiver 44 are applied to variable-delay line 62 through lead 63 and retrieved from the delay line a finite time interval later as determined by the location of wiper arm 61 relative to the plurality of delay-line contacts 64. At $\Delta R = 0$, which is when the pitch attitude of the vehicle is at the reference attitude, wiper arm 61 assumes an intermediate position as shown in FIG. 3 to provide a nominal finite delay in the composite return signal so that both positive and negative pitch-angle changes may be compensated for in providing a corrected range output from pitch-correction circuit 50. This output from the pitch-correction circuit 50 generates range marker 47, preferably after further processing in beam-pattern estimator 100, as hereinafter provided.

In a radar system of the type here described which processes ground returns throughout a beam width pattern, the composite return signals if applied directly to the cathode of the display tube results in forming a coarse range marker 45. This makes it difficult to accurately determine when the boresight axis of elevation antenna 14 is on target. That is, with an antenna having a characteristic finite beam width in the order of only 1 or 2 degrees, it will respond to echo returns over an area so that it cannot be determined by observing range marker 45 whether the beam is actually centered on the target or offset to one side or the other. To obviate this condition and generate a narrow hairline type of range marker approximating the antenna boresight axis, beam-pattern estimator 100 is employed in the system. The composite return signals are operated on by the beam-pattern estimator to provide a narrow pulse whose time position always corresponds to the same fraction of the antenna beam width swath independent of the signal amplitude level.

A functional block diagram of a preferred beam-pattern estimator unit is illustrated in FIG. 5. The video-detected composite return signal output of elevation receiver 44, after being processed in pitch-correction circuit 50, is applied to a threshold detector 101 through lead 102. The output of detector 101 operates a gate-signal generator 103 which simply shapes each composite return pulse into an appropriate gate pulse. These gate pulses are applied to gate 104 through lead 99 to pass the output of a voltage comparator 105 only in the presence of a composite return pulse. Noise signals occurring during absence of the composite return pulses are suppressed.

Voltage comparator 105 forms a part of a timing system, insuring that a narrow pulse output will always exist at the same part of each video-detected composite return pulse regardless of the amplitude of the composite return pulse. To accomplish this, the video-detected composite return pulses obtained at the output of receiver 44 are separated into two paths 106 and 107. Path 106 applies the video-detected composite return signal pulses, $e_1$, directly to voltage comparator 105. The other path 107 applies the video-detected composite return signal pulses to a delay line 108 where they are delayed in time and then applied to an amplifier 109 to provide the second input, $e_2$, to voltage comparator 105. A signal is obtained at the output 121 of voltage comparator 105 only when the magnitude of $e_2$ exceeds the magnitude of $e_1$.

Figure 8:
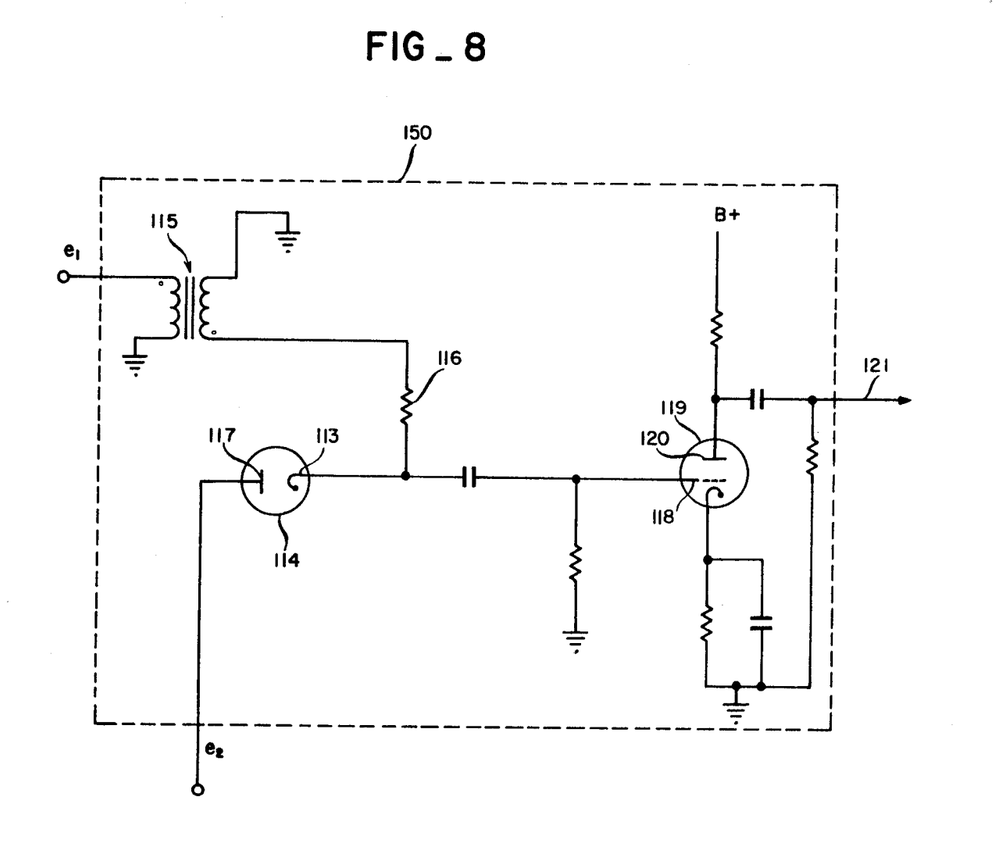
FIG. 8 is a schematic circuit diagram of the voltage comparator in FIG. 5.

Referring to FIG. 8, a suitable circuit for voltage comparator 105 is illustrated wherein the input signal $e_1$ is coupled to the cathode 113 of a diode 114 through transformer 115 and resistor 116. Input signal $e_2$ is applied to the anode 117 of the diode. When the voltage of $e_2$ exceeds the $e_1$ voltage, diode 114 becomes conductive, raising the potential on grid 118 of tube 119 and causing the tube to assume a conductive state until the $e_2$ voltage drops off. The output signal is obtained through lead 121 coupled to plate 120 of tube 119.

The output signal from voltage comparator 105, after passing gate 104, is differentiated at 110 to provide a narrow pulse signal whose time of occurrence corresponds to the voltage comparator output. Pulse generator 111 receives and reshapes the narrow pulse from differentiator 110 so as to optimize the signal which is applied to cathode 26 of tube 27 through lead 112 for forming range marker 45.

Let us now show mathematically that the timing of the output signal from voltage comparator 105 will be independent of the amplitude of the input signal $e_1$. In fact, it will depend only on the gain $A$ of amplifier 109 and the delay $\tau$ in delay line 108. To accomplish this, consider that the input waveform $e_1$, which is the video-detected composite return signal from elevation receiver 44, has its rise time limited by the carrier bandwidth and is of the form shown in FIG. 6. The signal $e_1$ may be expressed in equation form as follows:

$$e_1 = \frac{E}{T} \times t \qquad (1)$$

where $E$ represents signal voltage and $T$ represents time. The amplified and delayed signal $e_2$, also shown in FIG. 6, may be expressed in equation form as $$e_2 = \frac{AE}{T}(t - \tau). \qquad (2)$$

Hence, for $e_1 = e_2$ the time of occurrence of the output pulse is $$t = \frac{A\tau}{(A-1)}, \text{ where } A \text{ is greater than } 1. \qquad (3)$$

It is observed from equation (3) above that $t$ is independent of the input amplitude level $E$ and is a function of the two constants $A$ and $\tau$. These constants are chosen in the FIG. 5 circuit to provide a desired portion of the rise time of the input signal for timing. Hence, the range marker 45 may effectively be positioned with reference to the leading edge of the composite return pulses by the FIG. 5 circuitry.

Figure 7:
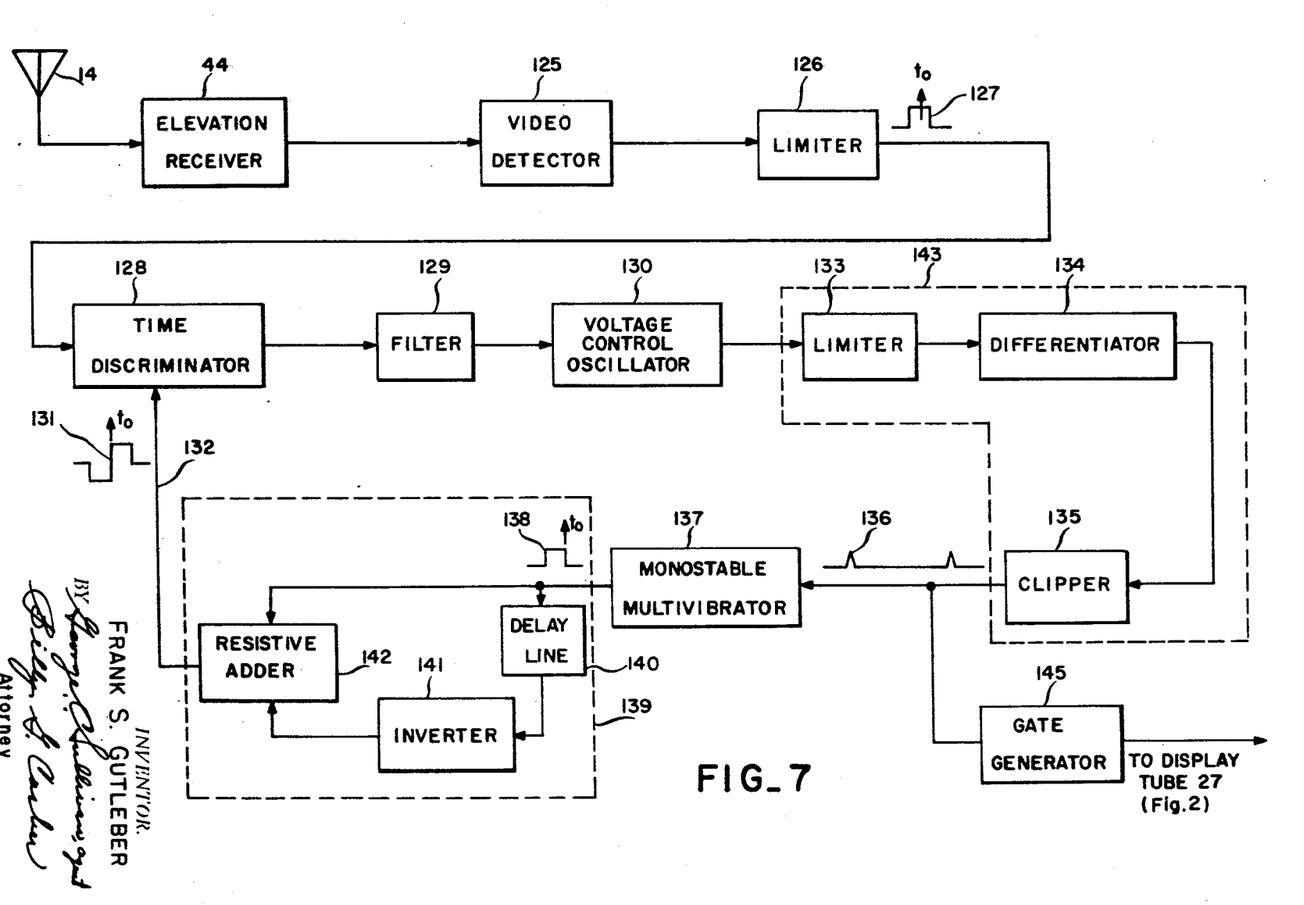
FIG. 7 is a schematic block diagram showing a modified type of beam-pattern estimator for the system of this invention.

An alternate circuit for beam-pattern estimator 100 is shown in FIG. 7. The reflected energy picked up by antenna 14 is successively processed in elevation receiver 44, video detector 125 and limiter 126 to provide a series of constant-amplitude composite return signal video pulses 127. These video pulses 127 are applied to a time discriminator 128 which yields a direct-current output control signal after low-pass filtering at 129 which is proportional to the time shift from $t_0$, where $t_0$ represents the near center of video pulse 127, approximating the boresight axis of antenna 14. The direct-current output control signal from filter 129 is applied to a voltage-controlled oscillator 130 having a center frequency at the pulse-repetition frequency of the radar system. The sine wave output from voltage-controlled oscillator 130 is used to generate a split-gate signal 131 which is applied at the second input to time discriminator 128 through lead 132, forming a lock-loop at the radar pulse repetition rate. The direct-current control signal output of time discriminator 128 is thus maintained directly proportional to the time difference between the loop input pulse 127 and split-gate signal 131.

In generating split gate signal 131, the sine wave output of voltage-controlled oscillator 130 is applied to a timing pulse generator 143 consisting of an amplitude limiter 133, differentiator 134 and clipper 135 to provide a series of narrow positive-going timing pulses 136 which drive monostable multivibrator 137. The repetition frequency of timing pulses 136 is synchronized with the frequency of the sine wave output from voltage-controlled oscillator 130. These timing pulses which drive multivibrator 137 are maintained in time lock with the beam center $t_0$ by delaying the output pulse 138 of multivibrator 137 an amount equal to its width and adding it to its inverted self. This is accomplished in split gate generator 139. The output of multivibrator 137 is applied to both delay line 140 and inverter 141 in the split gate generator. A resistive adder 142 forming a part of the split gate generator combines the outputs from delay line 140 and inverter 141 to form the split gate pulses applied to time discriminator 128.

Fundamentally, the time discriminator is a bidirectional gate wherein received input signal 127 gates the generated split gate signal 131 to provide a direct current control error voltage after low-pass filtering, whose magnitude is proportional to the time displacement from the axis crossover of split signal 131. This voltage changes the frequency of voltage-controlled oscillator 130 such that the error is reduced to zero, leaving the output of timing pulse generator 143 in time lock with the center of input pulses 127 representing essentially the boresight axis of antenna 14. To the extent $t_0$ in the FIG. 7 waveforms may not represent the exact beam center position, correction may be readily achieved by utilizing a properly off balanced split gate signal 131 as can be obtained, for example, by regulating the amount of delay imposed on the signal by delay line 140 in split gate generator 139.

Suitable specific circuitry for time discriminator 128 is shown and described in detail in section 14–16 on page 453 of textbook "Pulse and Digital Circuits" by Millman and Taub, McGraw-Hill, 1956. Sections 14–7 through 14–12 of that same text describe other bidirectional gates which could also serve as the time discriminator for the system herein disclosed.

The narrow timing pulses 136 from pulse generator 143, in addition to driving multivibrator 137, serve as the output of the FIG. 7 beam-pattern estimator. These timing pulses may be applied to cathode 26 of display tube 27 through a slow-gate generator 145 as shown in FIG. 7, which blanks some of the pulses to yield a narrow width dashed line for range marker 45, marking it more readily identifiable when superimposed on light and dark area pictures of the display.

The beam-pattern estimator of either FIGS. 5 or 7 will produce a fine range marker 45 accurately representing the aiming axis of elevation antenna 14, and are presented for purposes of illustration rather than limitation. Moreover, where elevation-angle information need not be determined with a high degree of accuracy, beam-pattern estimator 100 may be omitted in its entirety. It should be understood that these and other modifications, alterations and substitutions may be made to the instant disclosure without departing from the teachings of the invention as defined by the spirit and scope of the appended claims.

I claim:

1. A radar system comprising, transmitter means radiating pulsed electromagnetic energy in a generally vertically oriented fan beam which sweeps repeatedly in azimuth across a desired field of view, receiver means detecting said energy reflected from objects in said field of view, position-sensing means associated with said transmitter means and providing a signal representing the instantaneous azimuth position of said fan beam, a cathode-ray tube connecting with the output from said receiver means and said position-sensing means and having a viewing screen providing a plan position indicator display of objects in the field of view according to their relative range and azimuth position, an antenna disposed approximate said transmitter means and having a fan-shaped narrow-beam energy response pattern generally normal to said vertically oriented fan beam and movable in elevation to intersect the vertical fan beam at any of a variety of selected elevation angles, elevation-receiver means for processing composite return signals picked up by said antenna to generate a range marker on the viewing screen representing an elevation-aiming angle for target tracking, and variable delay means coupled to said elevation-receiver means and time shifting said composite return signals to stabilize said range marker.

2. A device as defined in claim 1 including a beam pattern estimator responsive to said composite return signals for locating said range marker on the viewing screen relative to the boresight axis of said antenna.

3. A device as defined in claim 1 including a range computer coupled to said elevation-receiver means and providing an output range signal, sensing means responsive to attitude changes relative to a reference attitude and having an error angle output as a function of the antenna-aiming angle relative to a reference angle, multiplier means having an output combining said range signal and said error angle output as a function of the antenna-aiming angle relative to a reference angle, and servo means responsive to the output from said multiplier means for controlling said variable delay means.

4. A device as defined in claim 2 wherein said beam-pattern estimator includes a timing circuit responsive to said composite return signals and providing an output pulse for each composite return signal which is delayed in time so as to always exist at the same position relative to the leading edge of each composite return signal independent of the amplitude of the composite return signal.

5. A device as defined in claim 4 wherein said timing circuit includes circuit means delaying and amplifying each said composite return signal, and a voltage comparator detecting the difference in signal magnitude between said composite return signal and the output from said circuit means to form said output pulse.

6. A device as defined in claim 5 including pulse-conditioning means responsive to each said output pulse for shaping said range marker.

7. A device as defined in claim 6 including gating means isolating said pulse-conditioning means from timing circuit noise occurring during the absence of said composite return signals.

8. A device as defined in claim 7 wherein said gating means includes a threshold detector.

9. A device as defined in claim 2 wherein said beam-pattern estimator includes a split gate generator producing a bidirectional pulse output in response to each composite return signal, and discriminator means regulating said split gate generator to maintain the crossover of said bidirectional pulse substantially in time lock with the boresight axis of said antenna.

10. A device as defined in claim 9 wherein said discriminator means includes a time discriminator responsive to said composite return signals for passing said bidirectional pulse output from said split gate generator, a filter responsive to the output of said time discriminator and providing a control error voltage proportional to the time displacement of the crossover of the bidirectional gate, and circuit means responsive to said control error voltage and forming a lock-loop with said time discriminator through said split gate generator to maintain said bidirectional pulse output in synchronism with said composite return signals.

11. A device as defined in claim 10 wherein said circuit means includes a voltage-controlled oscillator responsive to said control error voltage and providing an alternating output signal having a frequency which is controlled by said error voltage, and pulse-forming means responsive to said output signal for generating a train of narrow pulses at the output signal frequency of said voltage-controlled oscillator for driving said split gate generator.

12. A radar system for aircraft comprising, transmitter means radiating electromagnetic energy in a generally vertically oriented search fan beam which sweeps repeatedly in azimuth across a desired field of view, receiver means detecting said energy reflected from objects in said field of view, sensing means associated with said transmitter means and providing a signal representing the instantaneous azimuth position of said fan beam, visual display means responsive to the output from said receiver means and said position-sensing means and having a viewing screen providing a plan position indicator display of objects in the field of view according to their relative range and azimuth position, an antenna disposed approximate said transmitter means and having a narrow-beam energy response pattern movable in elevation to intersect the vertical fan beam at any of a variety of selected elevation angles, elevation receiver means coupled to said antenna for processing return signals picked up by said antenna, pitch-attitude-sensing means generating an error signal proportional to angular excursions in aircraft attitude relative to a predetermined reference attitude, a range computer responsive to said elevation receiver means for generating a range signal, multiplier means responsive to said pitch-attitude-sensing means and said range computer to provide an output combining said error signal and said range signal as a function of the elevation angle setting of said elevation antenna, variable delay means coupled to said elevation receiver means, and servo means driven by the output from said multiplier means and positioning said variable delay means to provide a corrected range output signal for generating a range marker on the viewing screen which is substantially independent of said angular excursions in aircraft attitude.

13. A device as defined in claim 12 including a beam-pattern estimator responsive to said return signals for positioning said range marker on the viewing screen to approximate the boresight axis of said antenna.

14. In an object-locating system adapted to be carried on a moving platform and having both a direction-finding antenna and display means for imaging remote objects on a viewing screen, a device for generating a synthetically stabilized range marker on the viewing screen comprising, receiver means coupled to the antenna for processing signals received through said antenna, range computer means coupled to said receiver means and providing a received signal range output, sensing means responsive to actual attitude of the platform relative to a reference attitude and having an error angle output proportional thereto, multiplier means having an output combining said range output and said error angle output as a function of the antenna-aiming angle relative to the platform, variable delay means coupling the display means to said receiver means to generate an image marker on the viewing screen, and servo means driven by the output from said multiplier means and controlling said variable delay means to stabilize the image marker in the presence of variations in platform attitude.

15. An object-locating system comprising, transmitter means radiating electromagnetic energy in a generally vertically oriented search fan beam which sweeps repeatedly in azimuth across a desired field of view, receiver means detecting said energy reflected from objects in said field of view, sensing means associated with said transmitter means and providing a signal representing the instantaneous azimuth position of said fan beam, visual display means responsive to the output from said receiver means and said position-sensing means and having a viewing screen providing a plan position indicator display of objects in the field of view according to their relative range and azimuth position, an antenna disposed approximate said transmitter means and having a narrow-beam energy response pattern movable in elevation to intersect the vertical fan beam at any of a variety of selected elevation angles, elevation-receiver means coupled to said antenna for processing composite return signals picked up by said antenna to generate a range marker on the viewing screen representing an elevation-aiming angle for target tracking, and a beam-pattern estimator responsive to said composite return signals for locating said range marker on the viewing screen relative to the boresight axis of said antenna.

16. A device as defined in claim 15 wherein said beam-pattern estimator includes a timing circuit responsive to said composite return signals and providing an output pulse for each composite return signal which is delayed in time so as to always exist at the same position relative to the leading edge of each composite return signal independent of the amplitude of the composite return signal.

17. A device as defined in claim 16 wherein said timing circuit includes circuit means delaying and amplifying each said composite return signal, and a voltage comparator detecting the difference in signal magnitude between said composite return signal and the output from said circuit means to form said output pulse.

18. A device as defined in claim 17 including pulse-conditioning means responsive to each said output pulse for shaping said range marker.

19. A device as defined in claim 18 including gating means isolating said pulse-conditioning means from timing circuit noise occurring during the absence of said composite return signals.

20. A device as defined in claim 19 wherein said gating means includes a threshold detector.

21. A device as defined in claim 15 wherein said beam-pattern estimator includes a split gate generator producing a bidirectional pulse output in response to each composite return signal, and discriminator means regulating said split gate generator to maintain the crossover of said bidirectional pulse substantially in time lock with the boresight axis of said antenna.

22. A device as defined in claim 21 wherein said discriminator means includes a time discriminator responsive to said composite return signals for passing said bidirectional pulse output from said split gate generator, a filter responsive to the output of said time discriminator and providing a control error voltage proportional to the time displacement of the crossover of the bidirectional gate, and forming a lock-loop with said time discriminator through said split gate generator to maintain said bidirectional pulse output in synchronism with said composite return signals.

23. A device as defined in claim 22 wherein said circuit means includes a voltage-controlled oscillator responsive to said control error voltage and providing an alternating output signal having a frequency which is controlled by said error voltage, and pulse-forming means responsive to said output signal for generating a train of narrow pulses at the output signal frequency of said voltage-controlled oscillator for driving said split gate generator.

24. An improvement in object-locating systems having directional antenna means for receiving composite pulses of radiant energy from remote objects, and display means responsive to said composite pulses for indicating the position of said remote objects, wherein the improvement comprises, signal-processing means for sequentially delaying and amplifying each of said composite pulses to provide corresponding timing pulses, and voltage comparator means responsive to each of said composite pulses and to said corresponding timing pulses and detecting the threshold at which the voltage of said composite pulses is exceeded by the voltage of said corresponding timing pulses whereby to beam split said composite pulses and control said display means to indicate the approximate boresight axis of said antenna means.

25. An improvement in object-locating systems having directional antenna means for receiving composite pulses of radiant energy from remote objects, and display means responsive to said composite pulses for indicating the position of said remote objects, wherein the improvement comprises, a split gate generator producing a bidirectional pulse output in response to each composite pulse, a time discriminator coupled to the output of said split gate generator and responsive to said composite pulses for passing said bidirectional pulse output, filter means responsive to said bidirectional pulse output from said time discriminator and providing a control error voltage proportional to the time displacement of the axis crossover of the bidirectional gate, and circuit means responsive to said control error voltage and forming a lock-loop with said time discriminator through said split gate generator to maintain said bidirectional pulse output in synchronism with said composite pulses and control said display means to indicate the approximate boresight axis of said antenna means.